Sept. 10, 1968   L. CRANDALL ET AL   3,400,445
METHOD OF MAKING UNITARY TIRE REPAIR CARTRIDGE
Filed Jan. 7, 1966   2 Sheets-Sheet 1
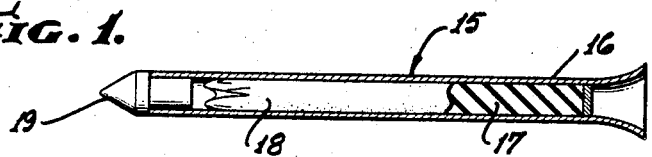
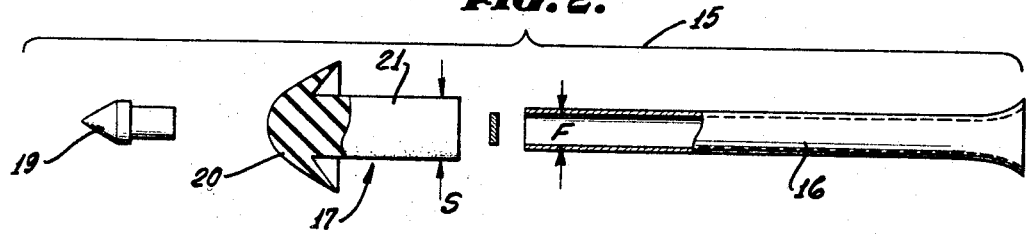
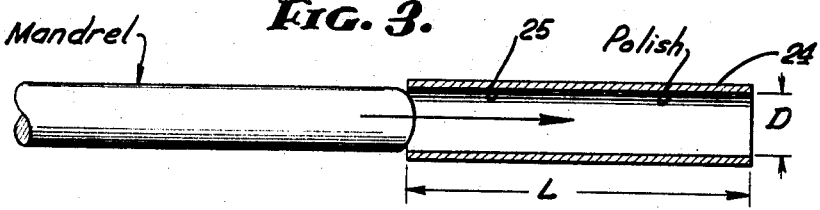
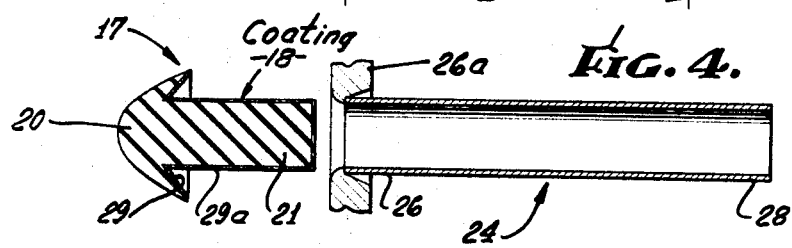
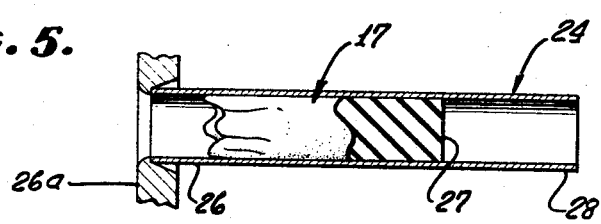
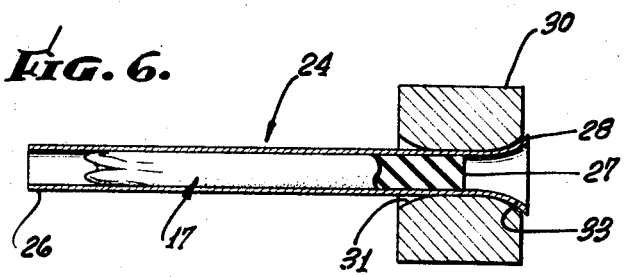
INVENTORS.
LOID CRANDALL
LOUIS D. LEONE
By Miketta, Glenny, Poms & Smith
ATTORNEYS.

Sept. 10, 1968    L. CRANDALL ET AL    3,400,445
METHOD OF MAKING UNITARY TIRE REPAIR CARTRIDGE
Filed Jan. 7, 1966    2 Sheets-Sheet 2
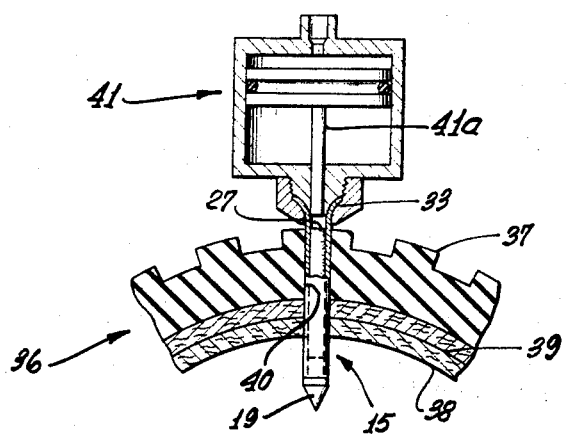
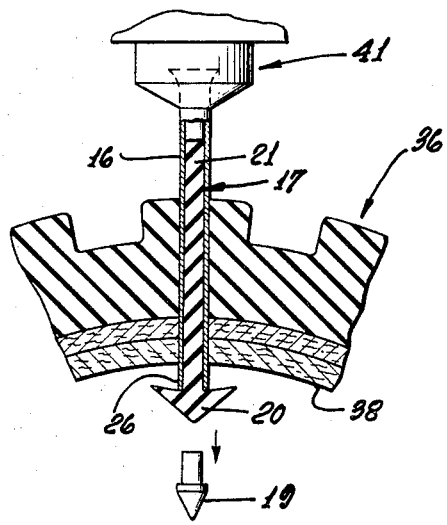
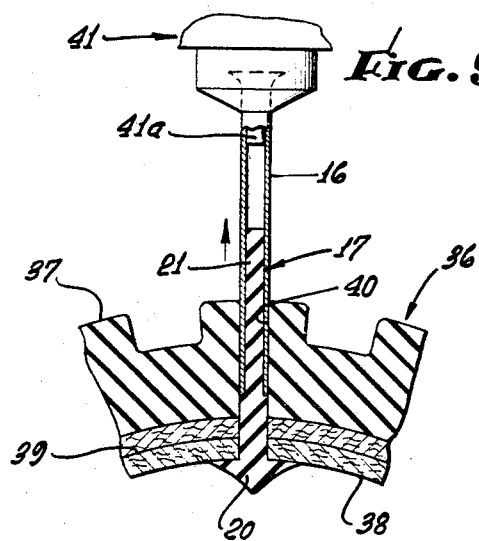
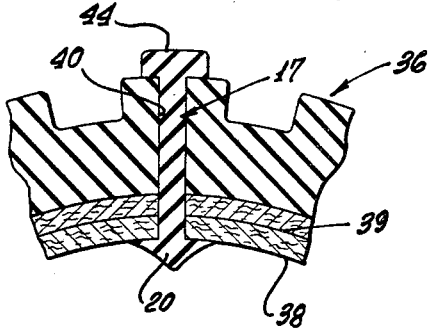
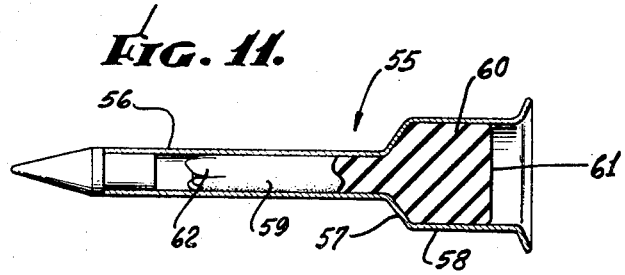
INVENTORS.
LOID CRANDALL
LOUIS D. LEONE
By Miketta, Glenny, Poms & Smith
ATTORNEYS.

United States Patent Office 3,400,445
Patented Sept. 10, 1968

3,400,445
METHOD OF MAKING UNITARY TIRE REPAIR CARTRIDGE
Loid Crandall, Granada Hills, and Louis D. Leone, Gardena, Calif., assignors to Active Engineering, Inc., Gardena, Calif., a corporation of California
Filed Jan. 7, 1966, Ser. No. 519,215
5 Claims. (Cl. 29—451)

This invention relates to a method of making a unitary tire repair cartridge construction. The invention also relates to a method of deforming a metal tube with a body of rubber material therein.

Prior proposed tire repair devices have included locating a tire repair rubber plug in a hollow metal tube by various methods, including pulling a plug with a tail into a hollow tube; pushing a plug into a tube; and holding a plug by longitudinally split ends of a hollow tube. Such various arrangements of assembling a rubber plug with a hollow tube are shown in Patents 594,869, 567,402, 550,560, 607,379, 725,171, 490,369, 1,545,831, 2,828,791, 2,990,736. In some such prior devices, the rubber plug was elongated as by stretching; in others, the plug was elongated by compressive forces applied thereto in the tube, and in still others, the stem of a plug was neither tensioned nor compressed but merely held in the tube without change of its normal dimensions. Moreover, such prior tire repair devices sometimes used lubricants on the plug to facilitate feeding and insertion of the plug in the hollow metal tube. Accurate positioning of a rubber plug in a hollow tube by the aforementioned methods was difficult, time consuming and costly. If the plug to be used had an enlarged or headed end to be contained within the hollow tube, positioning and placement of the plug in a metal tube became even more difficult, more costly and the number of defective or non-usable cartridges increased.

The present invention contemplates a new, rapid, effective method of assembling a plug body of rubber material within a hollow metallic tube. The present method achieves new advantages over such prior tire repair arrangements and is particularly adaptable for the modern two-ply, tubeless tires which has a relatively thin casing wall. Such a thin casing wall presents less surface in a puncture hole for coaction with a repair plug. It is therefore very desirable to employ a tire repair plug which will utilize all available surface of the puncture hole and surrounding surfaces of the tire and which will be rapidly, uniformly bonded and vulcanized to such surfaces so as to resist displacement inwardly or outwardly of the puncture hole in a minimum time period.

The present invention contemplates such a novel method of making a tire repair cartridge. In a preferred embodiment of the invention, an elongated metal hollow tube contains therewithin a cured rubber body having at least one of its ends spaced from an end of the tube. The cured rubber body is provided with a coating of uncured rubber. One end of the hollow tube is provided with means to connect the tube to a power device, such as a compressed air cylinder means, whereby the plug body may be displaced longitudinally a preselected distance so as to properly, initially position the plug body with respect to a puncture hole and the internal surface of the tire casing. The coating of uncured rubber coacts with an application of rubber cement provided with a catalyst compatible with the uncured rubber so as to rapidly affect a vulcanizing and bonding reaction between the rubber plug and the tire casing.

The present invention contemplates a novel method of making such a tire repair plug cartridge. In practicing an exemplary method of this invention, the internal surface of hollow tube stock is polished by passing a mandrel therethrough. The inner diameter of the hollow tube stock has a diameter slightly greater than the outer diameter of the stem of a headed plug body of rubber material so that the stem may be readily slidably inserted into the polished tube stock and positioned with ends of the plug spaced internally from ends of the tube stock. With the plug contained within the hollow tube stock, the tube stock is then sized or drawn through a die means which reduces the diameters of the tube to selected diameters for the ultimate tire repair cartridge. As the tube stock is progressively sized and reduced in diameter, the rubber material of the plug contained therewithin flows longitudinally within the tube and the stem portion of the rubber plug is reduced in diameter in accordance with the reduced inner diameter of the cartridge tube. Before inserting a plug into the tube stock, surfaces of the plug which will come into contact with tire casing surfaces may be coated with uncured rubber. The tire repair cartridge of this invention is therefore prepared and ready for application to a puncture hole which has been swabbed with a suitable selected rubber cement.

The primary object of the present invention therefore is to disclose and provide a novel method of making a tire repair cartridge.

Another object of the present invention is to disclose and provide a novel method of making such a tire repair cartridge wherein the plug body of rubber material is readily and easily positioned in tube stock virtually without tensioning or pressing said rubber plug body when it is placed in the tube stock.

A still further object of the present invention is to disclose and provide a novel method of making a tire repair cartridge whereby in the process of reducing the diameter of tube stock to the desired cartridge diameter, means for holding the cartridge in a power device is readily provided in the form of an outwardly flaring end portion of the cartridge tube.

A still further, general object of the invention is to disclose and provide a novel method for deforming metal tube stock including the step of positioning a body of rubber material within the tube stock before deformation thereof.

Various other objects and advantages of the present invention will be readily apparent from the following description of the drawings, in which exemplary embodiments of the present invention are shown.

In the drawings:

FIG. 1 is a side elevation partly in section of a tire repair cartridge embodying this invention.

FIG. 2 is an exploded view of the several elements comprising the tire repair cartridge shown in FIG. 1.

FIG. 3 is a view with tube stock in section showing a polishing step in the practice of the method of this invention.

FIG. 4 shows tube stock in section and with a plug body ready for the step of insertion of the plug body into the tube stock.

FIG. 5 shows completion of the insertion of the plug body in the tube stock.

FIG. 6 illustrates the step of sizing the tube stock with the plug body therein.

FIG. 7 illustrates insertion of a tire repair cartridge embodying this invention into a tire wall by use of a power device.

FIG. 8 illustrates the step of displacing the plug body in the cartridge tube inwardly of the tire to eject a cap on the tube and to expose the headed end of the plug.

FIG. 9 illustrates withdrawal of the cartridge tube from the plug body and tire.

FIG. 10 illustrates the plug body finally positioned in the puncture hole in the tire.

FIG. 11 is a side view partly in section of a modification of the tire repair cartridge embodying this invention.

A tire repair cartridge generally indicated at 15 which has been made by the method of this invention includes an elongated cartridge tube 16 containing therewithin a body or plug of rubber material 17, a coating 18 of uncured rubber on a portion of rubber body 17, and a pointed cap or tip 19 to facilitate insertion of unitary cartridge 15 into a puncture hole. These elements of the tire repair cartridge 15 are shown in exploded view in FIG. 2 where it should be noted that the rubber plug body 17 in its original form and shape comprises a head portion 20 of shallow conical form and a stem portion 21 having an original diameter S greater than the final inner diameter F of the cartridge tube 16. Coating 18 is located on the back face of head portion 20 and on the adjacent section of the stem portion 21.

Generally speaking, the present invention is primarily concerned with the method or process by which plug body 17 is introduced and positioned in cartridge tube 16 by a unique process which effectively conditions the plug body 17 for facilitating its entry, positioning, and functioning as a rubber plug for stopping the escape of fluid, such as air, from a rubber member such as a vehicle tire casing which has been punctured by a nail or other object.

In the method of making a unitary tire repair cartridge 15, a tube 24 (FIG. 3) of suitable metal tube stock (e.g. low carbon steel) is selected with an inner diameter D greater than the final inner diameter F indicated in FIG. 2. Tube stock 24 is of uniform diameter throughout its length and may be pre-cut to a selected length L which is less than the final length of cartridge tube desired. After tube stock 24 is cut to selected length, its internal cylindrical surfaces 25 are polished or smoothly finished by suitable surface finishing methods, such as ball sizing, or lug drawing a mandrel through tube stock 24. When a polishing mandrel is drawn through tube stock 24, the wall thickness of the stock may be reduced and the length of the tube elongated (compare FIGS. 3 and 4).

Plug body 17 has a stem portion 21 with an outer diameter S which is slightly less (.002 or .003) than the inner diameter D of tube stock 24. A feeding fixture 26a of suitable tool metal may be positioned at end 26 of tube stock 24 to facilitate insertion stem end first of plug body 17 in tube stock 24. Stem portion 21 may thus be readily inserted into the tube stock 24 virtually without resistance or compressing the same. As the head portion reaches the outwardly flared opening in fixture 26a, the conical head is drawn backwardly into folded relation and readily inserted into tube stock 24 because the section and shape of the conical head in such backfolded relation does not contain sufficient rubber material to form an outer dimension which will prevent entrance of the head portion into the tube stock 24. The plug body 17 is thus readily pushed and positioned within tube stock 24 with the backfolded head portion spaced from but generally proximate to end 26 of the tubular stock 24. Since the plug body is not under compression nor under stress, the stem length is virtually the same as that shown in FIG. 2 and end face 27 of the stem portion will be spaced from tube stock end 28 a substantial distance as compared with the spacing of the backfolded head from the tube stock end 26.

Before inserting plug body 17 into tubular stock 24, back surfaces 29 of headed portion 20 and adjacent surface portions 29a of stem portion 21 may be coated with uncured or semicured rubber. These surfaces will become the surfaces which will be in contact with tire and puncture hole surfaces. The coating 18 of uncured or semicured rubber contacts the tire surface and, in presence of a rubber cement which contains a selected catalyst reacting with the uncured rubber coating 18, vulcanizing of the plug body to the tire casing is facilitated and sealing of the puncture hole is effectively accomplished.

After tube stock 24 has been so assembled with plug body 17, the assembly may be drawn through a sizing die means 30 having a die orifice 31 of a selected outer diameter of cartridge tube 16. Tube end 26 is first introduced into the die means 30 and, as tube stock 24 is drawn through die means 30, the tube stock 24 is drawn, sized and reduced. Two drawing passes may be made. As a result of sizing by means of die means 30, the final diameter F of cartridge tube 16 is formed. The rubber plug body 17, because of the progressive reduction of the inner diameter of tube stock 24, flows longitudinally and is also reduced in diameter. End face 27 of stem portion 21 is finally located in relatively close spaced relation to end 28 of the tube. Preferably end face 27 of the plug body is located approximately at the commencement of an outwardly flaring end flange 33 whose largest diameter may be that of tube stock 24. The outwardly flared end 33 of the tube cartridge 16 is adapted to serve as a connector for a power device such as an air gun to push plug body 17 out of the cartridge tube 16. A thin pressure disc or washer 34 may be seated on end face 27, washer 34 having sliding clearance with the internal surface of the reduced tube stock.

At the opposite end of cartridge 16, a pointed head or cap 19 made of suitable material such as plastic may be inserted to facilitate entrance of cartridge 16 into a puncture hole or a hole in a rubber member. The pointed cap 19 facilitates passage of the cartridge tube by cords of a tubeless tire without damage to the cords.

The completed assembled unitary tire repair cartridge 15 is thus readily economically and effectively made. Features of this process should be noted: First, the interior surfaces of the tube stock are finished so as to facilitate not only the easy entry and insertion of plug body 17 into tubular stock 24, but also, after sizing, to facilitate its smooth, uniform ejection from the cartridge tube without damage, scraping or roughing of the surface of the plug body. Second, the cartridge tube is of uniform diameter except for outwardly flared end 33. Third, the plug body within the cartridge tube is not forced into the tube and placed under longitudinal compression or tension. The sizing operation reduces the stem diameter and displaces the rubber material of the plug body longitudinally of the cartridge tube. In this respect, is should be noted that flow characteristics of the rubber material are utilized. Since the plug body was not placed under longitudinal compression or tension, elongation thereof is not the result of such stresses. Instead, the plug body material is displaced longitudinally by action of die 30 which progressively produces a reduction in diameter of the plug body and produces flow of rubber material rather than stressing the rubber material.

In FIGS. 7, 8, 9 and 10, the method is diagrammatically illustrated by which a tire repair cartridge 15 may be employed to repair a puncture hole in a tubeless tire repair cartridge. In FIG. 7 is shown a sectional view of a tubeless tire 36, the tire 36 having a tread portion 37 and a casing portion 38 provided with customary cord layers 39. In this example, a two-ply tire casing with two cord layers 39 are shown since such a two-ply casing presents unusual difficulties in repairing puncture holes therein due to thinness of the casing wall section.

After puncture hole 40 is located, a probe member (not shown) is inserted into the puncture hole for application of a liquid cement or adhesive in a manner similar to that described in Crandell Patent 3,175,432. The cement or adhesive is preferably a rubber cement containing a catalyst compatible with and adapted to react with the uncured rubber coating 18 on the plug for the purpose of rapidly effecting a vulcanizing action to virtually integrally bond the plug body to the material of the tire casing. The grooves of the probe member described in said Patent 3,175,432 may carry the rubber cement into the puncture hole and deposit it therein in an effective manner.

A suitable fluid actuated power device 41 may then be attached to a cartridge 15 at flared end 33. Such a power device may include an air cylinder and a piston actuated by compressed air which normally is readily available in a gasoline service station or tire repair shop. With the cartridge 15 attached to the power device, the pointed tip 19 is inserted into the puncture hole and the cartridge 15 inserted therein to a selected depth, that is until tip 19 of the cartridge extends into the interior of the tire casing and end 26 of the tube clears the internal surface of the tire casing.

Upon application of pressure air to power device 41, the piston rod 41a therein is moved a selected distance to press against end 27 of plug body 17 and to cause the plug body to move longitudinally in the cartridge tube to eject cap 19 therefrom and to also cause head portion 20 to clear tube end 26 and the interior surface of the tire casing (FIG. 7). Such clearance of head portion 20 permits head portion 20 to expand within the tire casing. The cartridge tube 16 may now be withdrawn by pulling upwardly on the power device 41 to which it is still attached and to thereby progressively deposit the elongated reduced stem 21 of the plug in the puncture hole. In such withdrawal of tube 16, it will be apparent that the expanded head portion 20 abuts the internal surface 38 of the tire casing and acts as a stop means for outward movement of the plug body 17. In this respect it should be noted that the previously polished internal surface of the tube and the presence of uncured rubber therein between the plug surface and polished surface of the tube facilitates the slipping over and off of the tube with respect to the plug body 17. After tube 16 has been withdrawn from tire casing 37, it may be disconnected from the power device 41 and must be discarded.

It is important to note that when outwardly directed forces are applied to the cartridge that the expanded head portion 20 is urged and pressed tightly against the margins of the internal surface 38 of the tire casing surrounding the puncture hole 41. The uncured rubber coating 18 on the back faces of the head portion 20 are thus pressed into intimate bonding contact with quantities of rubber cement which were deposited in the puncture hole 40 and some of which have been pushed out of puncture hole 40 by the cartridge 15 when it was inserted into the puncture hole. Thus, at margins of the tire casing surrounding the puncture hole, the rubber cement and uncured coating may react in a vulcanizing action to provide a virtually integral bond between the flared expanded head portion 20 of the tire repair plug and the internal surface of the tire casing. A similar vulcanizing and bonding action will occur between the coating 18 on the stem section adjacent to the head portion and the cement which remains on the walls of the puncture hole. Thus, virtually the entire external surface of the stem portion 21 which is deposited in the puncture hole will be subject to such bonding action and will become virtually integral with the tire casing.

It should also be noted that the puncture hole which had been previously expanded by the cartridge tube will now contract and also frictionally grip the stem portion 21. Thus a rapid intimate bond is provided between the rubber plug and surfaces of the tire casing which comprise the puncture hole surfaces and internal surfaces of the tire casing surrounding the puncture hole. Thus, in a two-ply tire casing having a relatively thin wall section, a repair plug may be positioned and bonded in such a way as to become an integral part of such casing. It will be apparent that the expanded headed portion 20 will prevent outward displacement of the plug because of internal pressure fluid acting on the external faces of the head portion 20.

FIG. 10 illustrates a tire casing with the plug body 17 deposited therein. The outer end 44 of the plug body may expand laterally as the rubber thereof flows to seek its normal original dimensional relationship. The outer head 44 may be left untouched since it will be worn off when the tire is used. Of course, if desired, the outer head 44 may be simply removed by cutting so that the outer end face of the installed plug is flush with the tread surface.

In FIG. 11, a modification of the cartridge 15 is illustrated. The method of making the modified tire repair cartridge 55 is virtually the same as that described above for the first embodiment and differs therefrom in that when the tube stock is drawn to size through a die means, such as 30, the cartridge tube may be provided with a tube portion 56 of a diameter similar to that of cartridge tube 16 for a selected portion of its length. At a length which may be the equivalent or greater of the thickness of the casing wall including a tread portion, the cartridge tube 55 may be flared radially outwardly as at 57 to provide an enlarged portion 58. The enlarged portion 58 may be of the same diameter as the original tube stock or it may be somewhat reduced as by drawing that portion through a suitable sizing die.

The tire repair plug 59 may be of the same shape and configuration as plug 17 but since only a portion of the tube has been reduced to the diameter as indicated by portion 56, the flow of rubber material during such sizing reduction will leave a portion of rubber material still deposited in the enlarged portion 58. One of the advantages of this construction is that when a power device such as 41 is attached to the end of the cartridge tube 55 and pressure forces are applied against the end face 61 of the enlarged end 60 of the rubber plug, displacement of end face 61 for a selected distance will result in a greater displacement of the plug in headed portion 62 in proportion to the difference in areas of the end face 61 and the reduced portion 59. Thus a relatively small displacement at enlarged portion 58 will result in a relatively large displacement at the pointed end of the cartridge tube.

It has also been found that the presence of a body of rubber material in a tube being sized and reduced in diameter provides advantages in such deforming of the tube. When the rubber body is of a Shore hardness of 32 to 50 and a tube is being sized with different diameters as mentioned with respect to FIG. 10, the walls of the tube which are thinned by the sizing process are supported by the body of rubber material and a more uniform sizing operation is achieved. Deforming, as by bending, of tube stock containing such rubber material is also facilitated.

While the exemplary embodiment of the tire repair cartridge discloses use of a headed plug, it will be understood that plugs of plain cylindrical form or other desired shapes may be used. In such cases, the uncured rubber may coat all or a portion of the cylindrical surfaces.

To those skilled in the art it will be understood that a novel method is provided for positioning a rubber tire repair plug within a metal tube and a resulting tire repair cartridge with a plug of rubber material is carried in the tube in preconditioned shape or form for entry and deposit in a puncture hole. Since the plug is virtually unstressed and coated with uncured rubber, and the internal surfaces of the tube are polished, shelf or storage life of the repair cartridge is relatively great.

All modifications and changes coming within the scope of the present claims are embraced thereby.

We claim:

1. In a method of making a tire repair plug cartridge which includes a hollow tube and a rubber plug body having a backfolded enlarged head contained within the tube, the steps of:

polishing the internal surface of a pre-cut hollow tube having an inner diameter greater than a selected inner diameter of the cartridge;

inserting a rubber plug with an enlarged head and with a stem of a diameter less than said pre-cut tube inner diameter and greater than said selected diameter, into one end of the tube with its stem end first so as to backfold said enlarged head;

positioning said backfolded headed plug in said tube with end portions of the plug spaced from ends of the tube; and sizing said tube with the plug contained therein whereby said inner diameter of the tube is reduced to a selected cartridge diameter and the rubber material of said plug flows longitudinally within the tube whereby the deformed plug is adapted to be deposited in a puncture hole as said tube is stripped therefrom.

2. In a method as stated in claim 1 including the step of guiding the stem end of said plug into said tube.

3. In a method as stated in claim 1 including the step of coating at least a portion of the surfaces of said headed plug with uncured rubber before insertion into said tube.

4. In a method of making a tire repair plug cartridge which includes a tube and a rubber plug contained within the tube, the steps of:

polishing the internal surface of a precut tube of an inner diameter greater than a selected inner diameter of the cartridge tube;
 coating a rubber plug having a diameter not greater than the inner diameter of the precut tube with a coating of semi-cured rubber;
 inserting said coated plug into one end of said precut tube;
 positioning said plug in said pre-cut tube with end portions of the plug spaced from ends of the tube;
 and drawing said tube with the plug contained therein to reduce the diameter of said pre-cut tube and plug and thereby form a tire repair plug cartridge having an elongated plug adapted to be deposited in a puncture hole in such elongated condition as said tube is stripped therefrom.

5. In a method of making a tire repair plug cartridge including a tube and a rubber plug contained therewithin, the steps of:

coating a rubber plug of selected stem diameter with semi-cured rubber;
 positioning said coated plug into a tube having an inner diameter slightly greater than the diameter of said rubber plug;
 and sizing said tube with the plug contained therein to reduce the diameter of said pre-cut tube and plug whereby said plug is elongated in said tube and is adapted to be deposited in a puncture hole in such elongated condition.

References Cited

UNITED STATES PATENTS

| | | | |
|---|---|---|---|
| 570,256 | 10/1896 | Lavens | 29—517 |
| 1,227,346 | 5/1917 | Trood et al. | 29—517 |
| 1,463,015 | 7/1923 | Quay | 29—517 X |
| 1,681,829 | 8/1928 | Wesseler | 29—451 |
| 1,827,233 | 10/1931 | Hughes. | |
| 2,362,008 | 11/1944 | Hile. | |
| 2,606,849 | 8/1952 | Dantaizen. | |
| 2,828,791 | 4/1958 | Fromberg | 152—370 |
| 2,998,472 | 8/1961 | Bondon. | |
| 3,052,141 | 9/1962 | Mitchell | 152—370 X |
| 3,310,095 | 3/1967 | Klune | 152—370 |

CHARLIE T. MOON, *Primary Examiner.*